United States Patent [19]

Jaques et al.

[11] 4,389,813
[45] Jun. 28, 1983

[54] PLANTER TREE FOR FLOOR, WALL OR CEILING MOUNTING

[76] Inventors: Michael J. Jaques; Diane H. Jaques, both of 685 E. Monterey, Chandler, Ariz. 85224

[21] Appl. No.: 228,469

[22] Filed: Jan. 26, 1981

[51] Int. Cl.³ ............................................. A01G 9/02
[52] U.S. Cl. ........................................... 47/67; 47/83
[58] Field of Search .................. 47/39, 67, 69, 81, 79, 47/82, 83

[56] References Cited

U.S. PATENT DOCUMENTS

| | | | |
|---|---|---|---|
| 214,061 | 4/1879 | Stearns | 47/67 |
| D. 262,274 | 12/1981 | Lahr | 47/82 X |
| 262,335 | 8/1882 | Wagner | 47/83 |
| 3,108,401 | 10/1963 | Richardson | 47/39 |
| 3,455,055 | 7/1969 | Chute | 47/81 |
| 3,950,637 | 4/1976 | Rodin | 47/67 X |
| 4,033,072 | 7/1977 | Kobayashi | 47/83 X |

FOREIGN PATENT DOCUMENTS 324399 9/1957 Switzerland ............................ 47/71

Primary Examiner—James R. Feyrer

[57] ABSTRACT

A planter in the form of a hollow tree configuration having a trunk, branches extending laterally therefrom and having a support means attached to the top or bottom of the trunk for supporting the trunk of the tree configuration in a substantially vertical position. The planter may comprise a drainage sump for the planter at its base for humidifying with the drainage liquid the plants in the planter and a light fixture at its top for reflecting light rays onto the plants growing in the planter.

2 Claims, 11 Drawing Figures

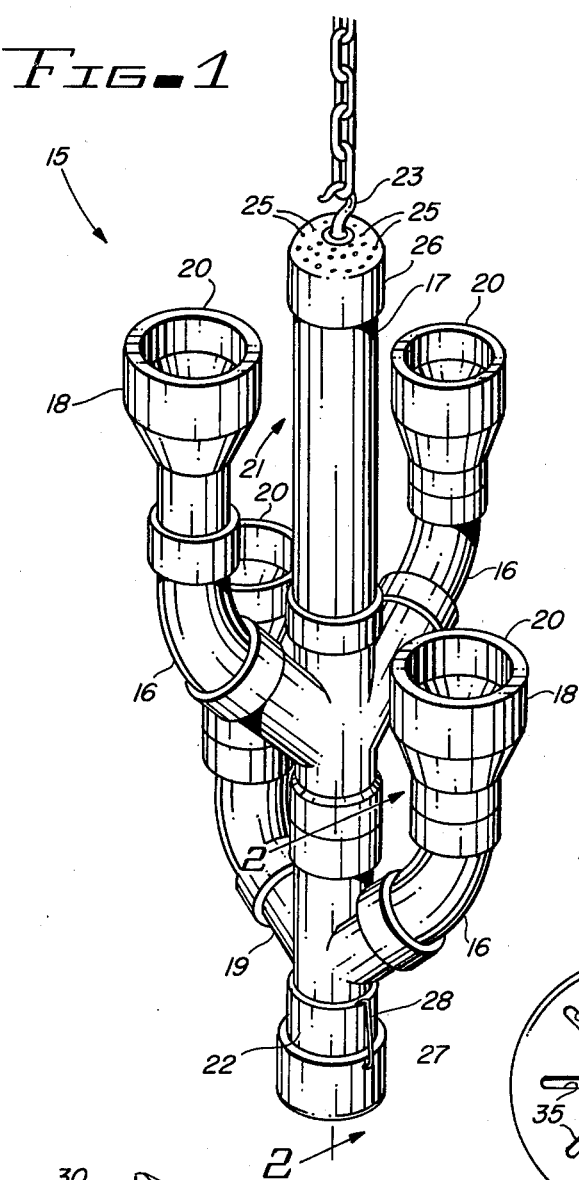
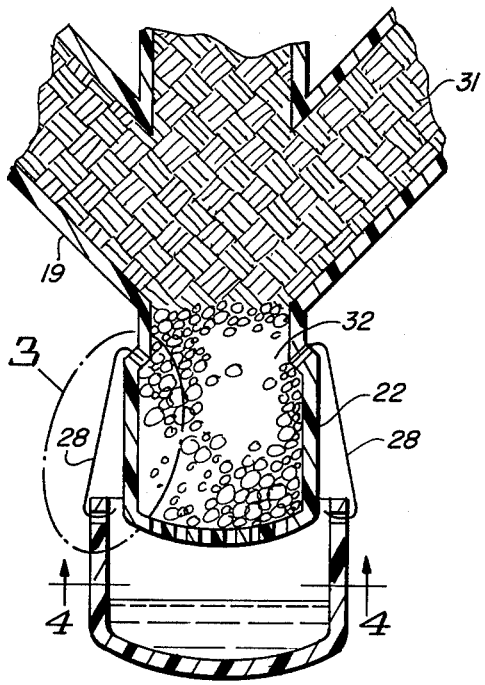
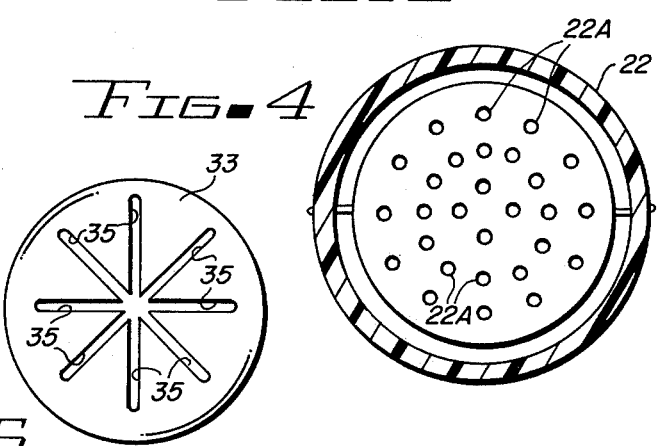
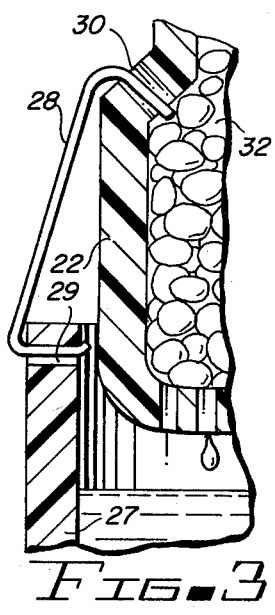
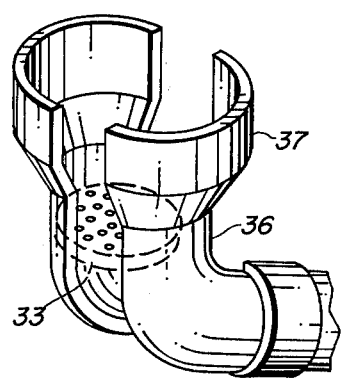
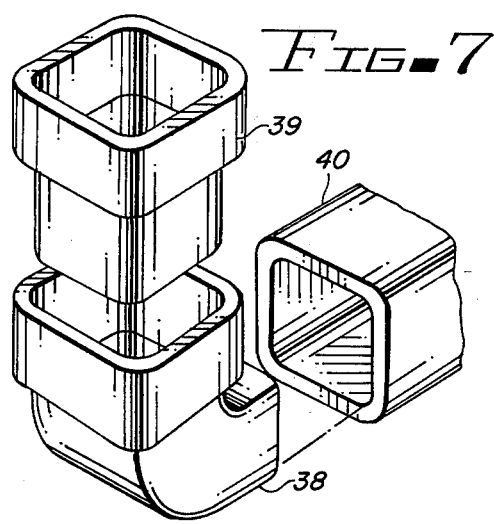

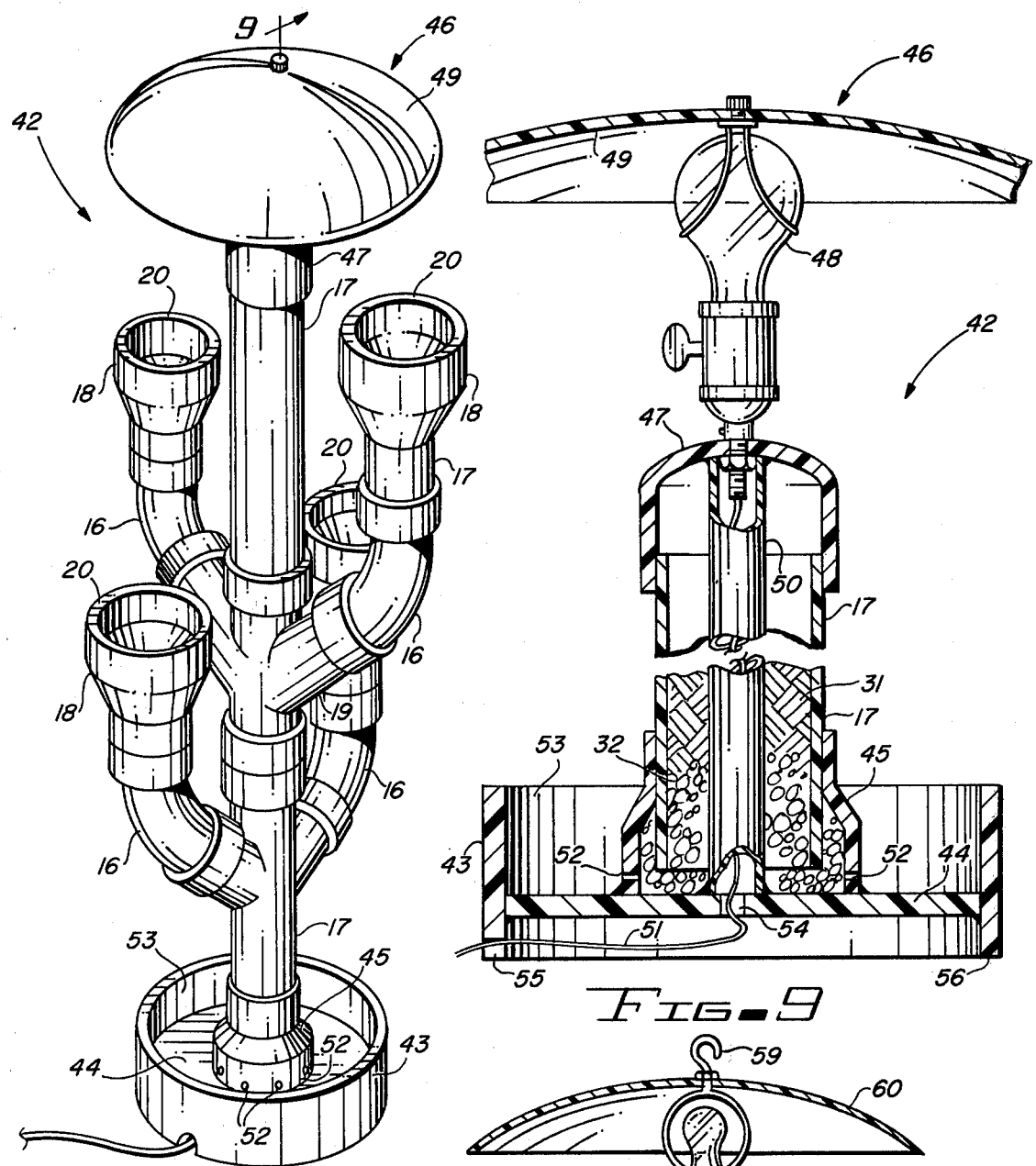
FIG-9
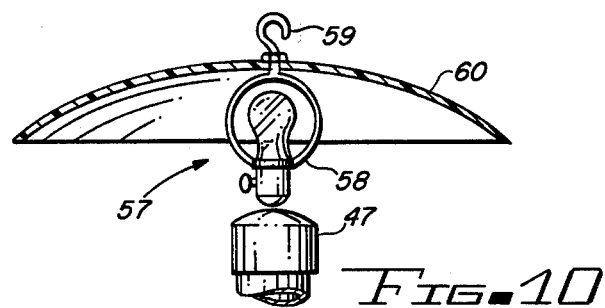
FIG-8
FIG-11
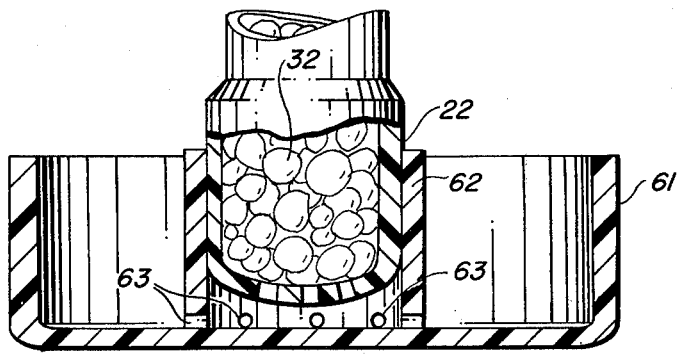
FIG-10

PLANTER TREE FOR FLOOR, WALL OR CEILING MOUNTING

BACKGROUND OF THE INVENTION

This invention relates to planters and more particularly to a planter in the form of a tree that has a common drainage for all branches of the tree configuration and can be floor supported or wall or ceiling mounted and is a continuation in part of our copending application Ser. No. 169,924 filed July 17, 1980 and entitled PLANTER TREE abandoned and refiled as copending application, Ser. No. 358,015, filed Mar. 15, 1982 and entitled PLANTER TREE.

Until recently one of the obstacles to growing plants indoors was the need to place the plants in an area receiving sufficient outdoor light or to produce the right kind of artificial light at the right time in sufficient intensity to make tropical and semitropical plants, which are the vast majority of indoor ornamentals, feel at home indoors. With the introduction of artificial light, especially light from fluorescent fixtures, hundreds of plants that once were limited to their native climate are easily cultivated under electric lamps.

Artificial lighting has also permitted an almost unlimited choice of location for plants from such an obvious spot as the living room to a seemingly impossible site like a windowless basement.

Prefabricated garden units on a grand scale at several levels are available and movable flower carts have been used to decorate a home or office. None, however, are equally adaptable to brighten up a corner, flat wall or space without such modification as would involve a cabinet maker to make the planter adaptable for a given purpose.

Many avid indoor gardeners are reluctant to undertake the installation of an indoor garden fixture since they visualize a bulky industrial-type hanging fixture that distorts the natural appearance of the wall and furniture of the room.

DESCRIPTION OF THE PRIOR ART

Although the artful indoor gardener can usually solve decorating problems by choosing lighting fixtures and plants as carefully as he chooses complementary furniture and carpeting, he is handicapped by need of a modifiable planter to fit the chosen space. Today, most planters have been designed to satisfy its functional needs and not the needs of space it must occupy. Accordingly, a new and easily modifiable planter is needed. No prior art is known that is directed to the claimed planter tree.

SUMMARY OF THE INVENTION

In accordance with the invention claimed, a new and improved self-contained planter is provided which may be floor supported or wall or ceiling mounted in any room of a home or office without destroying the functionality of the planter.

It is, therefore, one object of this invention to provide a new and improved planter.

Another object of this invention is to provide a new and improved self-contained planter tree employing nesting plants growing in soil or in hydroponic growing base at the end of each branch of the tree.

A further object of this invention is to provide a new and improved planter tree which has a common drainage system through the trunk of the tree for each branch thereof.

A still further object of this invention is to provide a new and improved planter tree in which the base of the trunk of the tree provides a drainage means for each branch of the tree and which may be floor mounted or hung from the ceiling or wall.

A still further object of this invention is to provide a new and improved planter tree embodying its own life generating lighting source A still further object of this invention is to provide a new and improved floor supported lighting fixture formed in the shape of a planter.

A still further object of this invention is to provide a new and improved planter designed in the form of a tree the trunk of which provides the dual function of a soil container and drainage system as well as a conduit for the electrical wires leading from the base of the planter to a light fixture mounted at its top.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of a self-contained wall or ceiling mounted planter tree embodying the invention;

FIG. 2 is a partial cross-sectional view of FIG. 1 taken along the line 2—2;

FIG. 3 is an enlargement of the circled area of FIG. 2;

FIG. 4 is a cross-sectional view of FIG. 2 taken along the line 4—4;

FIG. 5 is a modification of the hook engaging top of the planter shown in FIG. 1;

FIG. 6 is a partial perspective view of one of the branches of the planter tree shown in FIG. 1 illustrating how the planter tree may be formed of two or more molded parts;

FIG. 7 is a partial perspective view of one of the branches of a planter tree formed of square of rectangular shaped parts;

FIG. 8 is a perspective view of a modification of the planter tree shown in FIG. 1;

FIG. 9 is a cross-sectional view of the planter shown in FIG. 8;

FIG. 10 is a partial perspective view of the planter tree shown in FIGS. 8 and 9 embodying a hook on its top for wall or ceiling mounting; and FIG. 11 is a view partially in cross section illustrating a base for the planter tree shown in FIG. 1 rendering it floor supportable.

DESCRIPTION OF THE PREFERRED EMBODIMENT

Referring more particularly to the drawings by characters of reference, FIG. 1 discloses a planter 15 formed of hollow plastic tubular parts, most of which are commonly known in the plumbing trade as pipe fittings which can be formed specially of transparent or opaque material in any suitable color to fit the desires of the designer.

As noted from the drawing, these parts comprise elbows 16, connectors 17, couplings 18, tees 19 and other forms not covered by the preceding reference characters necessary to form the planter.

As shown in FIG. 1, planter 15 is formed in a tree-like configuration by frictionally engaging various pipe fittings to form a shape to fit the designer's requirements. If desired, these fittings may be cemented together when the form of the tree is fixed in the mind of the designer. Essentially, each branch of the tree has a hollow opening extending from the tip 20 of the branch through its trunk 21 to the base 22 of the planter. Thus, when the tree is assembled, it comprises a hollow tubular configuration draining from each opening at the various tips 17 to the base 19. The tree is supported by a hook 23 and chain 24 suitably connected to one of a plurality of holes 25 spacedly positioned in a cap 26 covering the top of the trunk 21. A drainage cap or sump 27 is secured to the bottom of trunk 21 by means of a pair of clamps 28 the ends of which are hooked between apertures 29 in sump 27 and apertures 30 in a base 22 of trunk 21. Base 22 is a perforated cap which drains into sump 27.

As shown in FIG. 3, the hollow interior of the planter tree 15 may be fitted with dirt or a suitable supporting material 31 which fills the branches and the trunk of the tree, with the base 22 of trunk 21 being filled with stones 32 or the like for drainage purposes.

It should be noted that it is intended to be within the scope of this invention to use a perforated barrier or screen 33, shown in FIG. 6, to only partially fill the branches of the tree with plant supporting material such as soil. This barrier or screen may be added at a desired point below the tip 20 of the branch to save the cost of filling the total branch of the tree and its trunk with soil or other matter. With this arrangement, the planter tree still maintains its drainage system from each branch of the tree to its base 22.

It should be noted that any plants positioned in the soil in the coupling 18 at the tips 20 of the branches may extend its roots as deeply into the branch of the planter as it desires thereby greatly reducing or eliminating root crowding and plant stunting.

FIG. 4 is a cross-sectional view illustrating the bottom of base 22 of the planter showing a plurality of holes 22A therein for the drainage of excess water content in the soil 31.

FIG. 5 illustrates a modification of the apertured configuration of cap 26 of FIG. 1 wherein a plurality of apertures or holes 25 are shown for providing a variety of points for the attachment of hook 23 so as to be able to hang the planter tree in a vertical position compensating for the differences in the weights of the various arms of the tree configuration.

In FIG. 5, cap 34 is provided with a plurality of slots 35 extending radially from the center of the cap in which the end of hook 23 may be slidably positioned and clamped in a selected position for balancing the planter causing it to hang in a vertical position.

FIG. 6 illustrates a modification of the pipe fittings shown in FIGS. 1 and 2 wherein an elbow 36 and coupling 37 is shown which are molded in two longitudinally extending parts and then glued or cemented together to form a unitary part. This illustration is intended to show that the planter tree can be formed of two or more molded parts suitably secured together to form a unitary structure.

FIG. 7 is a further modification of the various pipe fittings shown in FIGS. 1, 2 and 6 wherein the elbow 38, collar 39 and tubing 40 are of a square configuration having a hollow interior of a rectangular or square cross-sectional configuration.

These illustrations are intended to illustrate that the tree can be formed from plastic, fiberglass or other suitable materials and formed or molded in any geometrical configuration that will result in a planter tree whether simulating pipe fittings or merely a smooth surface tubular tree configuration.

FIGS. 8 and 9 disclose a further modification of the planter tree 15 shown in FIGS. 1 and 2 wherein like parts are given the same reference characters. In FIGS. 8 and 9, the planter tree 42 is provided with a base, pan or stand 43 for supporting the planter tree on the floor, ground or suitable platform. The stand is provided with a shelf 44 arranged between its open top and bottom onto which the lower edge of a collar 45 is suitably secured in a watertight arrangement with the open end of connector 17 of the tree opening into collar 45 in the manner shown in FIG. 9.

In order to provide a self-contained source of light for the planter, a suitable light fixture 46 is bolted to the top 47 of the planter. This light fixture, although embodying an incandescent bulb 48 and light reflector 49, can be modified to employ a fluorescent bulb of a straight line or circular form in place of bulb 48 together with its ballast and starter and still fall within the scope of this invention.

As shown in FIG. 9, a water impervious tube 50 is arranged to extend between top 47 and shelf 44 along the longitudinal axis of the planter and form a conduit for an electric wire 51 connected at one end to a source of power and at the other end to bulb 48 in the lighting fixture in a known manner. The electric wire 51 extends through an aperture 54 in shelf 44 and out of a notch 55 in stand 43 positioned along its platform supporting edge 56.

The space in stand 43 above shelf 44 serves as a sump for any water or liquid draining from the planter tree through its trunk and apertures 52 spacedly arranged around the base of collar 45 into the area 53 of the stand. Not only does the stand furnish a sump area for the drained liquids, but this excess liquid forms a humidifier for the plants growing in the planter.

FIG. 10 illustrates a further modification of the top of planters 15 and 42 wherein a light fixture 57 is mounted on top 47 of planter 42 and employing a ring 58 threadedly secured to the light fixture having a hook 59 extending through the top of the reflector 60 for hanging the planter from the ceiling or from a supporting arm (not shown) extending laterally and outwardly from a wall of a building.

FIG. 11 illustrates a stand 61 attachable to the base 22 of planter 15 of FIG. 1. By removing sump 27 from this planter and frictionally inserting collar or ring 62, axially positioned in the center of stand 61, over base 22, planter 15 can be rendered a platform, floor or ground mounted free-standing unit. Liquid draining from base 22 of the planter moves through apertures 63 in ring 62 into area 64 of the stand which excess liquid aids in humidifying the air above it around the plants growing in the planter.

Although this invention has been described with dirt or plant supporting material shown in the tubular configuration, it should be noted that flower pots may be placed in the tip 17 of the branches, if so desired.

Although but a few embodiments of the invention have been illustrated and described, it will be apparent to those skilled in the art that various changes and modifications may be made therein without departing from the spirit of the invention or from the scope of the appended claims.

What is claimed is:

1. A planter comprising:
   at least a pair of parts fitted together to form a hollow tree configuration having a trunk comprising a top and bottom, branches extending laterally therefrom and a base at the bottom of said trunk,
   each of said branches being open at its top for receiving therein and along at least a part of said trunk growing material for physically and nutritionally supporting root growth of plants growing in the tip of said branches, along said branches and in said trunk,
   the base of said trunk forming a drainage opening for any excess liquid moving from the branches of the tree and through its trunk to said base,
   support means connected to one of the ends of said trunk for supporting said trunk of the tree configuration in a substantially vertical position,
   a light fixture mounted on the top of said trunk,
   said light fixture comprising a reflector for reflecting light generated by said fixture onto any plants contained in the planter,
   a liquid impervious tube extending between said light fixture and said base of the planter axially of said trunk,
   an electric cord connected to said light fixture and extending through said tube outwardly of said base for connecting to a source of electric power, and
   a hook mounted on the top of said reflector for use in supporting the planter from a wall or ceiling structure.

2. A planter comprising:
   at least a pair of parts fitted together to form a hollow tree configuration having a trunk comprising a top and bottom, branches extending laterally therefrom and a base at the bottom of said trunk,
   each of said branches being open at its top for receiving therein and along at least a part of said trunk growing material for physically and nutritionally supporting root growth of plants growing in the tip of said branches, along said branches and in said trunk,
   the base of said trunk forming a drainage opening for any excess liquid moving from the branches of the tree and through its trunk to said base,
   support means connected to one of the ends of said trunk for supporting said trunk of the tree configuration in a substantially vertical position,
   said support means comprising a sump at the base of the trunk open to atmosphere for providing a humidifying effect for the plants in the planter,
   a light fixture mounted on the top of said trunk,
   said light fixture comprising a reflector for reflecting light generated by said fixture onto any plants contained in the planter,
   a liquid impervious tube extending between said light fixture and said base of the planter axially of said trunk, and
   an electric cord connected to said light fixture and extending through said tube outwardly of said base for connecting to a source of electric power.

* * * * *